US007787434B2

(12) United States Patent
Nandagopalan

(10) Patent No.: US 7,787,434 B2
(45) Date of Patent: Aug. 31, 2010

(54) METHOD ACCESS POINT AND PROGRAM PRODUCT FOR PROVIDING BANDWIDTH AND AIRTIME FAIRNESS IN WIRELESS NETWORKS

(75) Inventor: Sai Shankar Nandagopalan, Tarrytown, NY (US)

(73) Assignee: Koninklijke Philips Electronics N.V., Eindhoven (NL)

(*) Notice: Subject to any disclaimer, the term of this patent is extended or adjusted under 35 U.S.C. 154(b) by 445 days.

(21) Appl. No.: 10/566,513

(22) PCT Filed: Jul. 29, 2004

(86) PCT No.: PCT/IB2004/051333

§ 371 (c)(1), (2), (4) Date: Jan. 30, 2006

(87) PCT Pub. No.: WO2005/011199

PCT Pub. Date: Feb. 3, 2005

(65) Prior Publication Data

US 2006/0187895 A1 Aug. 24, 2006

Related U.S. Application Data

(60) Provisional application No. 60/491,594, filed on Jul. 31, 2003, provisional application No. 60/529,785, filed on Dec. 16, 2003.

(51) Int. Cl.
*H04B 1/06* (2006.01)

(52) U.S. Cl. ...................... 370/345; 370/338; 455/451; 455/452.2; 455/453

(58) Field of Classification Search ................. 370/345
See application file for complete search history.

(56) References Cited

U.S. PATENT DOCUMENTS

2003/0133427 A1 7/2003 Cimini, Jr.
2005/0018638 A1* 1/2005 Lindskog et al. ............ 370/338

FOREIGN PATENT DOCUMENTS

EP 1 227 626 A2 7/2002
WO WO 2005/011208 A1 2/2005

* cited by examiner

*Primary Examiner*—Lester Kincaid
*Assistant Examiner*—Charles Shedrick
(74) *Attorney, Agent, or Firm*—Larry Liberchuk

(57) ABSTRACT

The present invention provides a method (100), access point (20) and program product (35) for providing airtime and bandwidth fairness in wireless networks. To provide bandwidth fairness, a more fragment bit is set in a set of packets (46C) received by an access point (20) so that the packets of the set of packets (46C) can be transmitted to its destination (46C) successively (i.e., without back-off). To provide airtime fairness, upon receiving a packet (34) destined for a wireless station (22A), the access point (20) will calculate an airtime requirement for transmitting the packet (34), set a time counter (50) based on the airtime requirement. Thereafter, it will be determined whether the packet (34) can be transmitted to wireless station 22A before the time counter (50) expires. If not, transmission of the packet (34) will either not occur, or the packet (34) will be split into a set of fragments (48) for transmission.

24 Claims, 3 Drawing Sheets

METHOD ACCESS POINT AND PROGRAM PRODUCT FOR PROVIDING BANDWIDTH AND AIRTIME FAIRNESS IN WIRELESS NETWORKS

CROSS REFERENCE TO RELATED APPLICATION

This application claims the benefit of U.S. provisional application Ser. No. 60/491,594 filed Jul. 31, 2003 and U.S. provisional application Ser. No. 60/529,785 filed Dec. 16, 2003 both of which are incorporated herein in whole by reference.

In general, the present invention relates to a method, access point and program product for providing bandwidth and airtime fairness in wireless networks. Specifically, the present invention provides a way for a set of packets to be successively communicated to a wireless station from an access point while maintaining airtime and bandwidth fairness for other wireless stations.

As wireless computer technology becomes more pervasive, the need to better handle wireless traffic between access points and wireless stations/nodes increases. Specifically, in a wireless network such as a wireless local area network (WLAN), there are at least three types of traffic that can occur. A first type is referred to as uplink traffic, which refers to the transmission of content from a wireless station to an access point. A second type is referred to as downlink traffic, which refers to the transmission of content from an access point to a wireless station. The third type is known as sidelink traffic, which refers to the transmission of content from one wireless station to another. Particular issues arise with respect to downlink traffic from an access point to a wireless station. Specifically, referring to FIG. 1 an illustrative wireless network 10 is shown. As can be seen, a single access point such as access point 12 within Basic Service Set (BSS) 14 might have to communicate with multiple wireless stations 16A-C.

When communicating with a particular wireless station, ensuring adequate airtime and bandwidth fairness to the other stations often becomes a problem. For example, access point 12 might receive multiple streams of content from distributed system 18, each of which is destined for a different wireless station 16A-C. Not only must access point 12 determine the order in which to transmit the streams to their respective wireless stations, but access point 12 must also be sure not to allocate too much bandwidth and airtime to one wireless station. However, given the mobile nature of wireless stations, fairness is not easily accomplished. For example, under the I.E.E.E. 802.11b standard, there are at least 4 rates of communication within a WLAN, namely, 11 Mb/s, 5.5 Mb/s, 2 Mb/s and 1 Mb/s. In case of IEEE 802.11a WLAN there are 8 different physical transmission rates ranging from 6 Mb/s to 54 Mb/s. Consider the IEEE 802.11b WLAN example. As a wireless station migrates or moves away from its access point, the physical rate of communication therewith will drop. This is such that, wireless station 16A in close proximity to the access point 12 might receive data at the 11 Mb/s rate, while wireless station 16B that is moving away from access point 12 might only receive data at the 1 Mb/s rate. Since wireless station 16B moved away and lowered its physical transmission rate to 1 Mb/s, the time to transmit its MAC frame increases by 11 times (because of lowering its transmission rate from 11 Mb/s to 1 Mb/s). Accordingly, during the transition time of this frame, the other wireless stations 16B-C will have to wait for a longer time before they can access the wireless medium and transfer their date frames.

Heretofore, more fairness was attempted by providing "back-off" via the CSMA/CA protocol of IEEE 802.11. Specifically, if access point 12 needed to transmit four packets to wireless station 16A, access point 12 would transmit one packet, then back-off or cease transmission for a random period of time so that other communicating wireless stations 16B-C could access the medium and transmit their frames. After the random back-off period, the second packet would be transmitted followed by another random back-off period. This alternating of packet transmission and "back-off" would continue until all packets were transmitted.

Unfortunately, "back-off" can lead to several problems especially with packets containing audio or video content In particular, video and audio content are typically delay sensitive meaning that they cannot tolerate delays, and are not loss sensitive meaning that they can afford to lose some of their frames. This is in contrast to data content such as email and FTP traffic, which is loss sensitive, but not delay sensitive. Thus, since "back-off" will result in delayed transmission of packets and frames, it is difficult to provide the needed Quality of Service (QoS) for audio and video types of traffic when the medium becomes heavily loaded.

Still yet, in today's IEEE 802.11 WLAN, if a packet size intended for a wireless station is too large, the access point for the wireless station will fragment the large packet into smaller packets or fragments, and then transmit the fragments while performing a random back-off with SIFS (short inter frame space) time. The reason for fragmentation of the original packet could be because the packet is too large and is likely to be in error, or if there is a likelihood of a packet collision. Thus, there would be a need to wait for the entire duration of the packet before performing a retransmission process. In this case, the original packet will be split into small fragments, which are transmitted one by one after it acquires the medium. In the header of the first fragment it will the more fragment bit to indicate to the receiver (destination wireless station) that it will receive the additional fragments. In the transmission of the last fragment, the more fragment bit will be reset to indicate that this is the last fragment. Although this current technology could allow for multiple fragments of a single packet to be transmitted back to back, it fails to allow multiple packets to be transmitted back to back as a whole.

In view of the foregoing, there exists a need for a way to provide airtime and bandwidth fairness to wireless stations for downlink traffic without causing delayed transmission of packets or frames. Specifically, a need exists for an access point that is capable of transmitting successive packets to a single wireless station without adversely impacting traffic to other wireless stations.

In general, the present invention provides a method, access point and program product for providing bandwidth fairness and airtime fairness in wireless networks. Specifically, the present invention provides bandwidth and airtime fairness for downlink traffic. In a downlink scenario, there might be more than one stream of traffic destined for more than one destination. To initially provide bandwidth fairness, the present invention will use the concept of transmitting multiple fragments to transmit multiple packets. Specifically, the present invention will set a more fragment bit to transmit multiple packets back to back. For example, assume that there are two downlink packet streams destined to wireless stations 16A and 18B, respectively. Further assume that the individual packet size of both streams is 1000 bytes. In addition, the first stream has bandwidth requirement of 1 Mb/s and the second stream has the bandwidth requirement of 3 Mb/s. To provide bandwidth fairness, access point 12 should transmit one packet of stream 1 and three packets stream of 2 and repeat it with transmission of one packet of stream 1 and three packets of stream 2 and so on. Under the present invention, the more fragment bit of stream 2 is set to allow transmission of the three packets successively. Specifically, the more fragment bit for the first two packets of the stream, access point 12 is set so that destination station 16B knows that there are additional packets that are going to arrive (and all three packets will arrive within the SIFS time). This achieves multiple purposes. First, other wireless stations will not attempt to access the medium because all the packets are spaced in SIFS time, and thrice the bandwidth is apportioned to stream 2 compared to stream 1. Providing thrice the bandwidth for stream 2 because it requires 3 times the bandwidth of stream 1 (in the above example) is providing bandwidth fairness. In addition, this allows multiple entire packets to be transmitted back to back, which was not previously possible.

Issues of airtime fairness are raised when we consider wireless stations moving towards and away from an access point. Consider the same example and assume that the wireless station 16A receiving stream 1 starts moving away from access point 12 and starts lowering its physical transmission rate from 11 Mb/s to 1 Mb/s. At this point, stream 1's packet will occupy 11 times more airtime than stream 2's packet (who is closer to access point 12) because its physical transmission rate dropped from 11 Mb/s to 1 Mb/s (The time to transmit a packet is given by the following relation: Time_to_transmit packet=packet_length/Physical_transmission_rate). Accordingly, the transmission times of the packets of stream 2 are shifted by 11 units of real time. This will likely result in a quality of service (QoS) violation of stream 2 as the packets may miss their "deadlines." Further, the overall throughput of the entire network is lowered because one mobile station moved away and lowered its physical transmission rate. To prevent this from occurring, the present invention also provides airtime fairness. Specifically, instead of guarantying transmission of one packet of stream 1 and three packets of stream 2, the present invention provides one packet transmission time at 11 Mb/s for stream 1 and three times the packet transmission time for stream 2. The result is that if the wireless station 16A receiving stream 1 moves away from access point 12 and lowers its rate from 11 Mb/s to 1 Mb/s, wireless station 16A is provided with only time allocation equal to one packet transmission at 11 Mb/s. If access point 12 examines the physical transmission rate and determines that this time is not enough to transmit the packet at 1 Mb/s, it will either not transmit the packet of stream 1, or will try to fragment the packet into multiple packets/fragments to fit in the time allocated. To achieve this, an airtime counter for the stream is provided and is with the time needed to transmit this stream's packet or packets at the former transmission rate (i.e., an airtime requirement). In this example the airtime counter of stream one will be 1000 bytes/11 Mb/s, and the airtime counter of stream two is set as 3*1000 bytes/11 Mb/s. Thereafter, successive packets or fragments of stream 1 will be transmitted by access point 12 until the time counter expires. Once the time counter expires, stream 2 will be transmitted in an identical fashion until its time counter expires. Thus, the present invention guarantees back to back packet transmission without affecting the QoS requirements of the other streams present in the network and also prevents throughput degradation in the network.

A first aspect of the present invention provides a method for providing bandwidth fairness in wireless networks, comprising: receiving a set of packets on an access point for a wireless station, setting a more fragment bit in the set of packets; and transmitting successive packets of the set of packets from the access point to a wireless station without back-off.

A second aspect of the present invention provides a method for providing airtime fairness in wireless networks, comprising: receiving a packet on an access point for a wireless station; calculating an airtime requirement for transmitting the packet to the wireless station; setting a time counter on the access point based on the airtime requirement; and determining whether the packet can be transmitted to the wireless station before the time counter expires.

A third aspect of the present invention provides an access point for providing airtime and bandwidth fairness in wireless networks, comprising: means for calculating an airtime requirement for a packet received on an access point for a wireless station; means for setting a time counter based on the airtime requirement; and means for determining whether the packet can be transmitted to the wireless station before the time counter expires.

A fourth aspect of the present invention provides a program product stored on a recordable medium for providing airtime and bandwidth fairness in wireless networks, comprising: program code for calculating an airtime requirement for a packet received on an access point for a wireless station; program code for setting a time counter based on the airtime requirement; and program code for determining whether the packet can be transmitted to the wireless station before the time counter expires.

Therefore, the present invention provides a method, access point and program product for providing airtime and bandwidth fairness in a wireless network.

These and other features of this invention will be more readily understood from the following detailed description of the various aspects of the invention taken in conjunction with the accompanying drawings in which.

Figure 1:
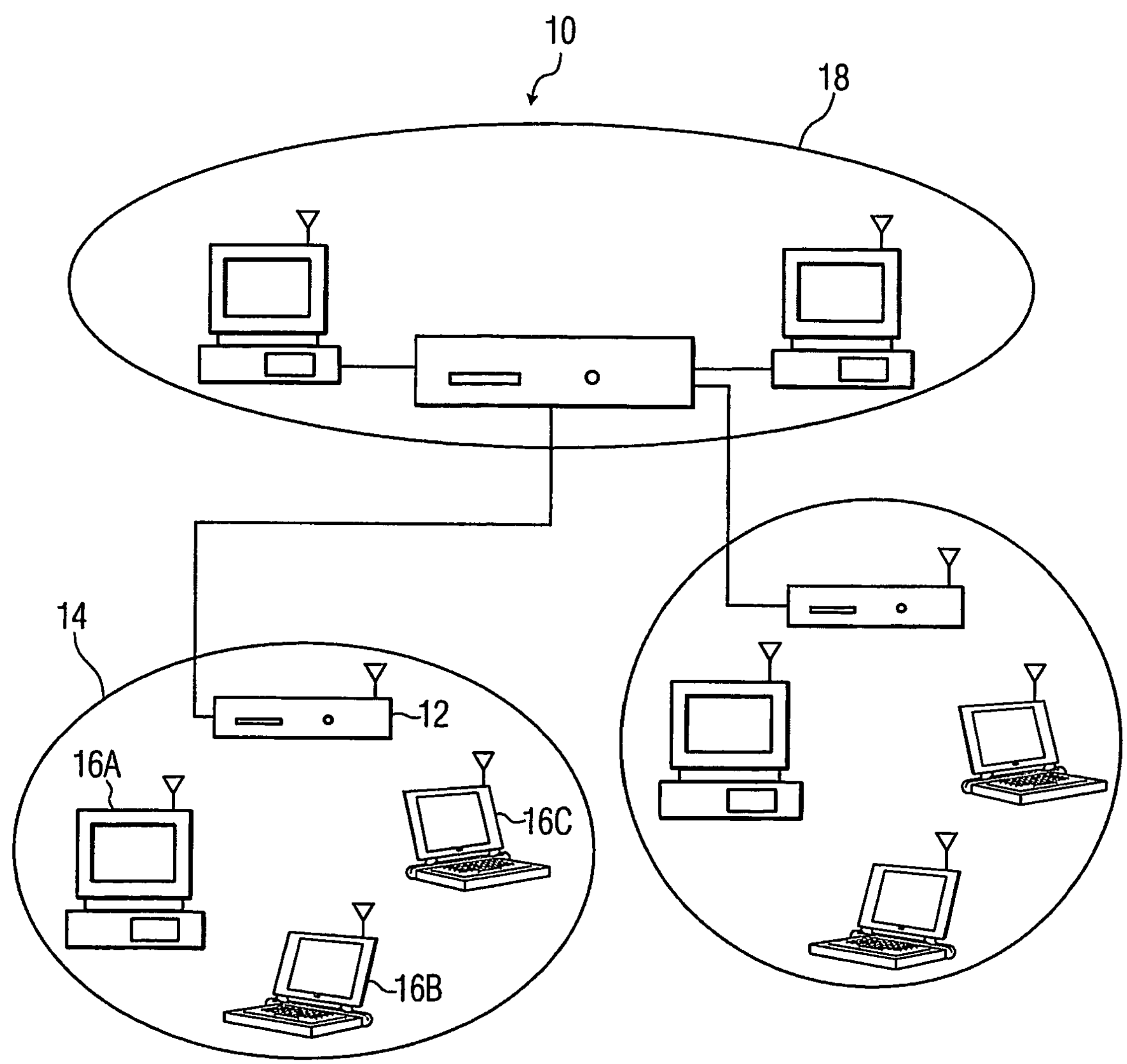
FIG. 1 depicts an illustrative wireless network.

The drawings are merely schematic representations, not intended to portray specific parameters of the invention. The drawings are intended to depict only typical embodiments of the invention, and therefore should not be considered as limiting the scope of the invention. In the drawings, like numbering represents like elements.

In general, the present invention provides a method, access point and program product for providing airtime and bandwidth fairness in wireless networks. Specifically, to provide bandwidth fairness, a more fragment bit will be set on a packet level so that multiple packets can be successively transmitted (e.g., back to back) from an access point to a wireless station. To provide airtime fairness, upon receiving a packet destined for a wireless station, an access point will calculate an airtime requirement for transmitting the packet, and then set a time counter based on the airtime requirement. Thereafter, it will be determined whether the packet can be transmitted to the wireless station before the time counter expires. If so, the packet will be transmitted. If not, the packet will either be split into a set of fragments that are transmitted to the wireless station, or not transmitted at all.

It should be understood that in a typical embodiment, the present invention is implemented within a wireless local area network (WLAN). However, it should be appreciated that the teachings described herein could be implemented with any type of wireless network in which access points are used to communicate with wireless stations. In any even, as known, under the I.E.E.E. 802.11 standard, several "layers" are provided in a wireless network. Such layer include, among others, an application layer, a TCP layer, an IP layer, a link layer that includes an LLC layer and a MAC layer, and a physical layer. Access points typically reside on the physical and MAC layers. As will be further described below, under the present invention, access points are configured to provide airtime and bandwidth fairness for wireless stations while allowing successive packets in a single stream to be transmitted to a particular wireless station in a back to back fashion (without "back-off").

Figure 2:
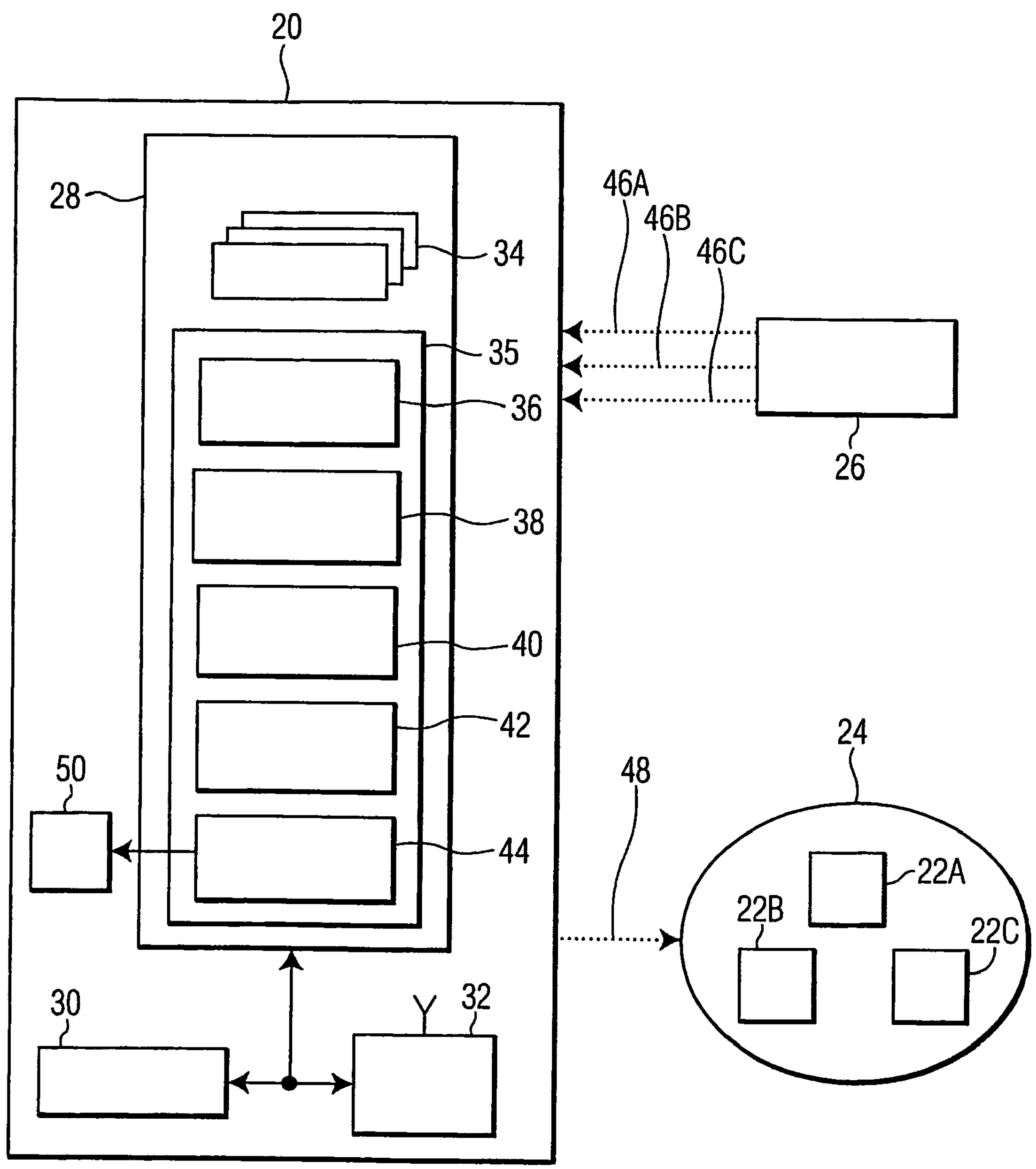
FIG. 2 depicts an illustrative access point according to the present invention.

Referring now to FIG. 2, an illustrative access point 20 according to the present invention is shown. As depicted, access point 20 fosters communication between wireless stations 22A-C within basic service set (BSS) 24 and distributed system 26. Under the present invention, access point 20 is configured to allow successive packets of downlink traffic to be transmitted to a particular wireless station (e.g., 22A) in a back to back fashion without interruption by a packet for another wireless station (e.g., 22B).

Before the present invention is described in further detail, it should be understood that access point 22A could be configured to provide this feature(s) in any known manner. To this extent, the present invention can be realized in hardware, software, or a combination of hardware and software. That is, the teachings of the present invention could be implemented through software-based or hardware-based means within access point 20. Any kind of components adapted for carrying out the methods described herein—is suited. A typical combination of hardware and software could be a component with a computer program that, when loaded and executed, carries out the respective methods described herein. Alternatively, a specific use component, containing specialized hardware for carrying out one or more of the functional tasks of the invention, could be utilized. The present invention can also be embedded in a computer program product, which comprises all the respective features enabling the implementation of the methods described herein, and which—when loaded in a computer system—is able to carry out these methods. Computer program, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

It should also be understood in advance FIG. 2 is intended to be illustrative only, and that access point 20, wireless stations 22A-C and/or distributed system 26 will likely contain additional components not shown. In any event, as depicted, access point 20 generally includes memory 28, processor 30 for executing instructions such as program code in memory 28, and communication system 32 for communicating with distributed system 26 and wireless stations 22A-C. Memory 28 typically receives streams of downlink traffic 46A-C from distributed system 26 intended for wireless stations 22A-C that each include one or more packets 34. As shown, access point 20 can receive multiple streams of downlink traffic 46A-C (e.g., three), each of can be destined for a different wireless station 22A-C, respectively. Under previous systems, access point 20 would transmit packets to a particular wireless station using the "back-off" method. For example, if multiple packets were to be transmitted to wireless station 22A, access point 20 would transmit a first packet thereto, followed by a "back-off" period during which packets could be transmitted to other wireless stations 22B-C. However, for various types of traffic such as packets containing video and audio content, the delay induced by the "back-off" period raises QoS issues. Under the present invention, access point 20 is configured to provide bandwidth fairness by allowing multiple successive packets to be routed to a single wireless station 22A-C without the "back-off" period. The present invention is further configured to provide airtime fairness by calculating an airtime requirement for transmitting a packet to a wireless station 22A-C and then setting a time counter based on an airtime requirement. If the packet can be transmitted before the time counter expires, transmission will occur. However, if the packet cannot be transmitted before the time counter expires, the packet will either not be transmitted, or will be split into a set of fragments that are separately transmitted.

Specifically, shown in memory 28 is a "fairness" program product 35 that includes stream selection system 36, airtime requirement system 38, packet splitting system 40, fragment setting system 42 and counter setting system 44. When streams of downlink traffic 46A-C are received by access point 20, a channel for communicating with wireless stations 22A-C will be accessed, and stream selection system 36 will determine which stream 46A-C will be handled first. In so doing, stream selection system 36 could incorporate any known algorithm (e.g., the TWFQ algorithm) for determining which stream 46A-C to transmit first without violating the QoS characteristics of the other streams.

In any event, in transmitting the streams 46A-C to wireless stations 22A-C, bandwidth fairness would be provided. Specifically, assume that the packet size of each stream 46A-C is 1000 bytes. In addition, assume stream 46A and stream 46B each have a bandwidth requirement of 1 Mb/s, while stream 46C has a bandwidth requirement of 3 Mb/s. To provide bandwidth fairness, access point 20 should transmit (e.g., via communication system 32) one packet of streams 46A-B and three packets stream of 46C and repeat it with one packet transmission of streams 46A-B and three packets of stream 46C and so on. Under the present invention, fragment setting system 42 would set the more fragment bit in a MAC header accompanying stream 46C to allow transmission of three packets successively (i.e., without back-off). Specifically, the more fragment bit for the first two packets of the stream, is set so that wireless station 22A knows that there are additional packets that are going to arrive (and all three packets will arrive within the SIFS time). Thus, under the present invention, if there are "N" packets in the stream 46C, the more fragment bit of "N-1" packets will be set.

The present invention will also provide airtime fairness. As indicated above, this can especially become an issue as a wireless station (e.g., 22A) migrates away from access point 20. Thus, for example, with respect to stream 46A, airtime requirement system 38 will first determine the airtime requirement for transmitting the packets 34 in stream 46A to wireless station 22A. In general, the airtime requirement is determined based on the size of the packet(s) 34 in the selected stream 46A and the transmission rate. For example, if the stream 46A intended for wireless station 22A is comprised of one 1000 mega bit packet 34, and the rate of transmission to wireless station 22A is 5 Mb/s, the total airtime requirement for transmitting packet 34 will be 200 microseconds.

Once the airtime requirement is calculated, counter setting system 44 will set/establish a time counter 50 that is based on the airtime requirement. For example, if the airtime requirement was calculated to be 200 microseconds, time counter 50 could be set for 200 microseconds. However, it should be understood that the time counter need not be set to the precise amount of the airtime requirement. Rather, time counter 50 could be set for a period of time that is longer or shorter than the calculated airtime requirement, as set forth by a predetermined set of rules or the like to ensure bandwidth and airtime fairness to the other wireless stations 22B-C is maintained. In any event, once time counter 50 is set, airtime requirement system 38 will determine whether packet 34 can be transmitted to wireless station 22A before time counter 50 expires. If it can, communication system 32 will transmit packet 34 thereto.

However, if packet 34 cannot be transmitted to wireless station 22A before time counter 50 expires, packet splitting system 40 will split packet 34 into a set of fragments. In a typical embodiment, the packet will be split into equal fragments. For example, the 1000 mega bit packet 34 could be spit into a set of ten 100 mega bit fragments, into a set of five 200 mega bit fragments, etc. Moreover, if the original stream 46A intended for wireless station 22A included more than one packet 34, each such packet 34 could be split in a similar manner. In any event, once the packet(s) 34 have been split into a set of fragments, communication system 32 can begin communicating the set of fragments. To this extent, the set of fragments may or may not be transmitted back to back in a manner similar to the transmission of multiple packets as described above.

It should be understood that FIG. 2 depicts a software-based implementation of the present invention for illustrative purposes only. Specifically, the underlying functionality of the present invention was shown and described in FIG. 2 as being performed by program code within access point 20. However, this need not be the case as the same functionality could be provided through hardware (or a combination of software and hardware).

Figure 3:
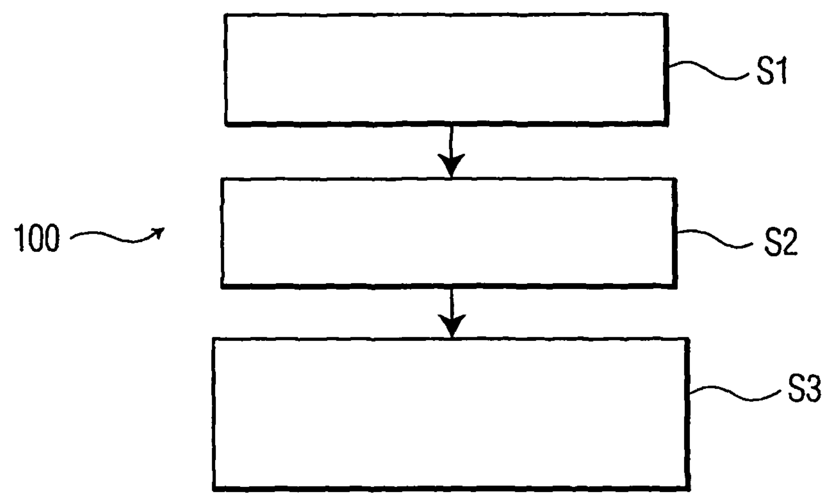
FIG. 3 depicts a first illustrative method flow diagram according to the present invention.

Referring now to FIG. 3, a method 100 for providing bandwidth fairness according to the present invention is shown. As depicted, first step S1 of method 100 is to receive a set of packets on an access point. Second step S2 is to set a more fragment bit in the set of packets. Third step S3 is to transmit successive packets of the set of packets from the access point to a wireless station without back-off.

Figure 4:
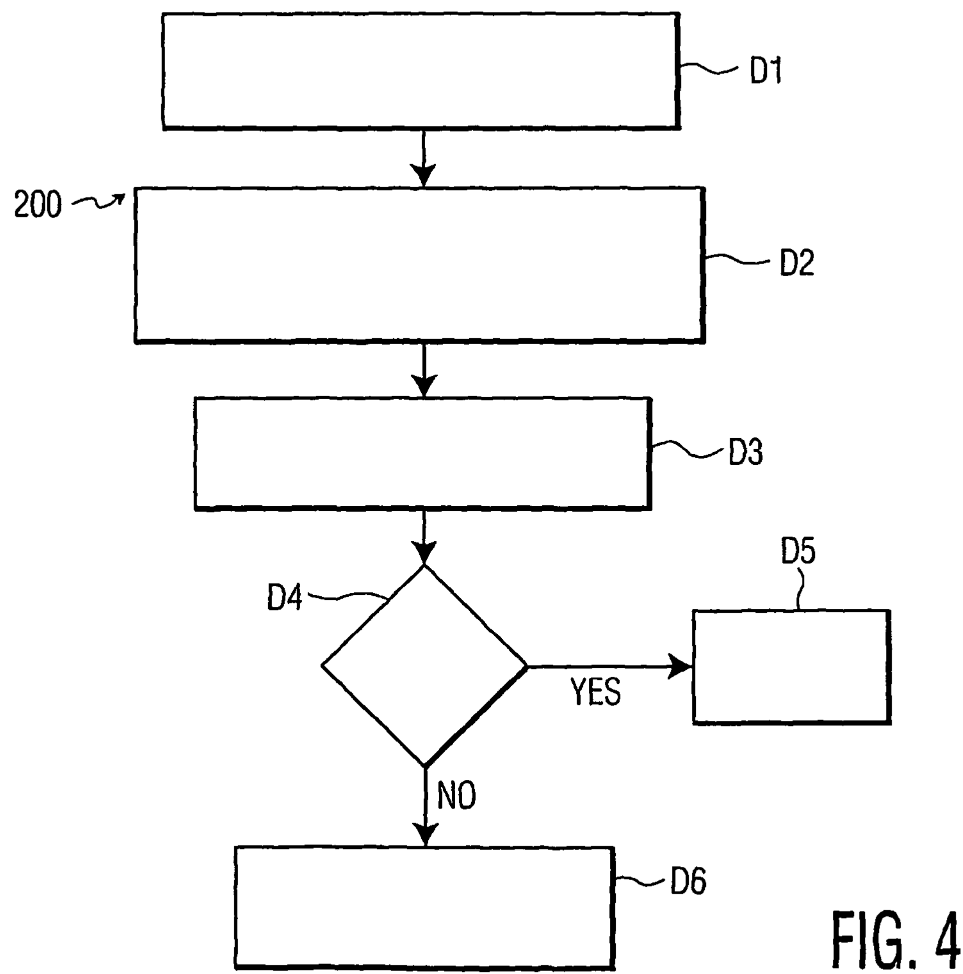
FIG. 4 depicts a second illustrative method flow diagram according to the present invention.

Referring now to FIG. 4, a method 200 according to the present invention is depicted. As shown, first step D1 of method is to receive a packet on an access point for a wireless station. Second step D2 is to calculate an airtime requirement for transmitting the packet to the wireless station. Third step D3 is to set a time counter on the access point based on the airtime requirement. Fourth step D4 determine whether the packet can be transmitted to the wireless station before the time counter expires. If the packet can bet transmitted to the wireless access point before the time counter expires, it will be transmitted in step D5. If, however, transmission cannot occur before the time counter expires, the packet will be split into a set of fragments in step D6.

The foregoing description of the preferred embodiments of this invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims.

The invention claimed is:

1. A method for providing bandwidth fairness in wireless networks, comprising:

receiving at least one stream of packets on an access point for at least one wireless station;

determining a bandwidth requirement for transmission of the at least one stream of packets to the at least one wireless station;

defining a ratio between a plurality of streams based on the bandwidth requirement;

based on the ratio, setting a more fragment bit of the at least one stream of packets when there are successive packets in the at least one stream of packets; and transmitting the successive packets of the at least one stream of packets from the access point to the at least one wireless station without back-off.

2. The method of claim 1, wherein the step of setting the more fragment bit, comprises setting the more fragment bit in a MAC header accompanying the at least one stream of packets to a value of 1.

3. The method of claim 1, wherein the at least one stream of packets comprises a plurality of packets.

4. The method of claim 1, wherein the more fragment bit is not set in a last packet of the at least one stream of packets to be transmitted.

5. The method of claim 1, comprising:

calculating an airtime requirement for transmitting the packet to the at least one wireless station;

setting a time counter on the access point based on the airtime requirement; and determining whether the packet can be transmitted before the time counter expires.

6. The method of claim 5, further comprising transmitting the packet to the access point.

7. The method of claim 5, further comprising splitting the packet into a set of fragments if the packet cannot be transmitted before the time counter expires.

8. The method of claim 7, further comprising transmitting the set of fragments until the time counter expires.

9. The method of claim 7, wherein the splitting step comprises splitting the packet into equal sub-packets to yield a set of fragments.

10. The method of claim 5, wherein the airtime requirement is calculated based on a size and a transmission rate of the packet.

11. An access point for providing bandwidth fairness in wireless networks, comprising:

means for receiving at least one stream of packets for at least one wireless station;

means for determining a bandwidth requirement for transmission of the at least one stream of packets to the at least one wireless station;

means for defining a ratio between a plurality of streams based on the bandwidth requirement;

based on the ratio, means for setting a more fragment bit of the at least one stream of packets when there are successive packets in the at least one stream of packets; and means for transmitting the successive packets of the at least one stream of packets from the access point to the at least one wireless station without back-off.

12. The access point of claim 11, further comprising:

means for calculating an airtime requirement for a packet received on the access point for the at least one wireless station;

means for setting a time counter based on the airtime requirement; and means for determining whether the packet can be transmitted to the at least one wireless station before the time counter expires.

13. The access point of claim 12, further comprising means for communicating the packet if the packet can be transmitted to the at least one wireless station before the time counter expires.

14. The access point of claim 12, further comprising means for splitting the packet into a set of fragments if the packet cannot be transmitted to the at least one wireless station before the time counter expires.

15. The access point of claim 14, wherein the means for splitting the packet splits the packet into equal sub-packets to yield the set of fragments.

16. The access point of claim 12, wherein the airtime requirement is calculated based on a size and a transmission rate of the packet.

17. The access point of claim 12, wherein the access point is a wireless access point implemented within a wireless local area network.

18. A program product stored on a non-transitory recordable medium, said medium having stored thereon machine readable instructions that, when executed, implement a method for providing bandwidth fairness in wireless networks, said method comprising:

receiving at least one stream of packets on an access point for at least one wireless station;

determining a bandwidth requirement for transmission of the at least one stream of packets to the at least one wireless station; defining a ratio between a plurality of streams based on the bandwidth requirement; based on the ratio, setting a more fragment bit of the at least one stream of packets when there are successive packets in the at least one stream of packets; and transmitting the successive packets of the at least one stream of packets from the access point to the at least one wireless station without back-off.

19. The program product as defined in claim 18, wherein said medium having stored thereon machine readable instructions that, when executed, implement the method for providing airtime and bandwidth fairness in wireless networks, said method comprising:

calculating an airtime requirement for a packet received on the access point for the at least one wireless station;

setting a time counter based on the airtime requirement; and determining whether the packet can be transmitted to the at least one wireless station before the time counter expires.

20. The program product of claim 19, further comprising program code for communicating the packet if the packet can be transmitted to the at least one wireless station before the time counter expires.

21. The program product of claim 19, further comprising program code for splitting the packet into a set of fragments if the packet cannot be transmitted to the at least one wireless station before the time counter expires.

22. The program product of claim 21, wherein the program code for splitting the packet splits the packet into equal sub-packets to yield the set of fragments.

23. The program product of claim 19, the airtime requirement is calculated based on a size and a transmission rate of the packet.

24. The program product of claim 19, wherein the program product is implemented on the access point that is implemented within a wireless local area network.

* * * * *